United States Patent [19]
Kalluri et al.

[11] Patent Number: 5,937,331
[45] Date of Patent: Aug. 10, 1999

[54] PROTOCOL AND SYSTEM FOR TRANSMITTING TRIGGERS FROM A REMOTE NETWORK AND FOR CONTROLLING INTERACTIVE PROGRAM CONTENT AT A BROADCAST STATION

[76] Inventors: Rama Kalluri, 870 E. El Camino Real #142, Mountain View, Calif. 94041; Joel Zdepski, 470 Levin Ave., Mountain View, Calif. 94040

[21] Appl. No.: 08/674,322

[22] Filed: Jul. 1, 1996

[51] Int. Cl.⁶ .................................................. H04N 7/16
[52] U.S. Cl. ................... 455/6.1; 348/6; 348/478
[58] Field of Search .................... 348/13, 12, 7, 348/6, 14, 15, 16, 17, 18, 19, 478; 455/4.2, 5.1, 6.1, 6.2, 6.3; 371/32, 33; H04N 7/16, 7/173

[56] References Cited

U.S. PATENT DOCUMENTS

| | | | |
|---|---|---|---|
| 2,735,889 | 2/1956 | Canfora | 371/32 |
| 5,283,639 | 2/1994 | Esch et al. | 348/6 |
| 5,400,402 | 3/1995 | Garfinkle . | |
| 5,424,770 | 6/1995 | Schmelzer et al. | 348/9 |
| 5,448,568 | 9/1995 | Delpuch et al. . | |
| 5,537,416 | 7/1996 | MacDonald et al. | 371/32 |
| 5,594,490 | 1/1997 | Dawson et al. | 348/6 |
| 5,600,573 | 2/1997 | Hendricks et al. | 348/6 |
| 5,682,148 | 10/1997 | Gaskill et al. | 371/32 |

FOREIGN PATENT DOCUMENTS

| | | |
|---|---|---|
| 95 119809 | 12/1995 | European Pat. Off. . |
| 95 15654 | 6/1995 | WIPO . |
| 95 28799 | 10/1995 | WIPO . |
| 95 31069 | 11/1995 | WIPO . |
| 96 10888 | 4/1996 | WIPO . |

OTHER PUBLICATIONS

Garr, M.J. et al., "Data Broadcasting in the USA Low Cost Delivery Alternative and More," IEEE Transactions on Consumer Electronics, vol. 36, No. 4, Nov. 1, 1990, pp. 877–884.

*Primary Examiner*—Chris Grant
*Attorney, Agent, or Firm*—Bruce J. Bowman; Jeffrey D. Carter

[57] ABSTRACT

A digital broadcast station is configured to turn around and add interactive programming to a television signal originally conveyed by a remote network. The remote network inserts trigger commands within the vertical blanking intervals (VBIs) of the television signal to control the loading and playing of the interactive program at the broadcast station. The protocol associated with the trigger commands allows commands to be repeated to thereby ensure that the interactive program is controlled correctly, even in the event that an original command was not received or was corrupted in the transmission. If a repeated trigger command is received by the broadcast station and the original command was not properly received, the interactive program source enters an error recovery state to determine the appropriate action for the interactive program source. For certain commands, such as continue, pause and stop, the interactive program source responds to the repeated command without further error compensation. For other commands, such as a command to play a specified file at a particular time, an error recovery mechanism compares the time code associated with the command with the local time and indexes into the specified file at a point which compensates for the difference between the particular time indicated by the command and the actual time for playing.

17 Claims, 8 Drawing Sheets

Fig. 8

| Transition Number | Associated Trigger | Original or Repeated | Decoder Activity |
|---|---|---|---|
| 1 | Continue | N/A | Instruct player to resume playing the flow |
| 2 | Pause | N/A | Instruct player to pause the flow |
| 3 | Stop | N/A | Kill player |
| 4 | Play | original | Start player at the specified time and play the specified file |
| 5 | Stop | N/A | Kill player |
| 6 | Time | N/A | Verify the timecode on the TCG with the local time and make necessary corrections taking into maximum jitter 1/60 sec. |
| 7 | Play | repeated | Determine offset given by starting time-code and current time |
| 8 | Play | repeated | Start player in the middle of the file, using the offset determined in transition #7 |

PROTOCOL AND SYSTEM FOR TRANSMITTING TRIGGERS FROM A REMOTE NETWORK AND FOR CONTROLLING INTERACTIVE PROGRAM CONTENT AT A BROADCAST STATION

BACKGROUND OF THE INVENTION

1. Field of the Invention

This invention relates to interactive television systems and more particularly to the insertion of interactive program content within a television signal originating at a remote network.

2. Description of the Relevant Art

The emerging technology of interactive television holds a promise of allowing a television set to serve as a two-way information distribution mechanism. Proposed features of interactive television accommodate a variety of marketing, entertainment and educational capabilities such as allowing a user to order an advertised product or service, compete against contestants in a game show, or request specialized information regarding a televised program. Typically, the interactive functionality is controlled by a "set top" decoder which executes an interactive program written for the television broadcast. The interactive functionality is often displayed upon the television's screen and may include icons or menus to allow a user to make selections via the television's remote control.

Several unique problems are posed for a digital broadcaster of interactive television, particularly for configurations involving "turn arounds". The term "turn around" refers to a configuration in which a video feed originating at a remote network comes into the digital broadcast plant. The video feed from the remote network is often in an analog format and may be a live telecast. When the video feed is received at the digital broadcast plant, it is demodulated or decoded and converted into the native format of the digital broadcast plant. One such native format is SMPTE-259M, which is a 270 Mbps digital studio standard. The native video signal is routed throughout the broadcast plant, possibly taped and time shifted, and is subsequently routed to a video encoder where it is compressed and retransmitted. For the vast majority of broadcasts, the content does not reside within the digital broadcast plant for more than several hundred milliseconds.

If a digital broadcaster desires to add interactive functionality to a television signal originating at a remote network, the interactive programming information must be inserted at the proper time. However, present practices are such that the digital network operator does not need, nor have, elaborate information regarding the content playing on the turn around channel. Although there is sufficient information to build a program guide indicating the approximate times of the airings of specific programs, there is not sufficient information to determine exactly when a particular program will begin, when commercials will be played, and whether certain preemptive actions have been taken. This information remains with the program originator, which is geographically remote and typically operated as a separate business.

To complicate the problem still further, the order of playing interactive content and the ability to invoke "day of air" edits should be controlled by the signal originator. Although the interactive programming information could be provided directly by the signal originator, most remote networks are neither equipped to provide interactive programming nor have suitable transmission formats and bandwidth to allow for interactive content. In addition, it is often desirable that the digital broadcaster be able to maintain control over the actual airing and content of the interactive programming, which is typically not possible or practical if the interactive programming information is provided directly by the signal originator.

An interactive television system may thus be configured such that commands are sent from a remote network to a broadcast station where the interactive content is actually combined with the television signal. A problem can occur within such a configuration, however, if the command from the remote network is for some reason not received at the broadcast station, or is otherwise corrupted in the transmission. If such a failure occurs, the interactive program content will not play in accordance with the commands from the remote network. A protocol and system for transmitting commands from a remote network and for controlling interactive program content at a broadcast station are thus desirable which alleviate the problems of failed command transmissions from the remote network.

SUMMARY OF THE INVENTION

The problems outlined above are in large part solved by a protocol and system for transmitting triggers from a remote network and for controlling interactive program content at a broadcast station in accordance with the present invention. In one embodiment, a digital broadcast station is configured to turn around and add interactive programming to a television signal originally conveyed by a remote network. While conveying the television signal, the remote network inserts trigger commands within the vertical blanking intervals (VBIs) of the television signal to control the loading and playing of the interactive program at the broadcast station. The protocol associated with the trigger commands allows commands to be repeated to thereby ensure that the interactive program is controlled correctly, even in the event that an original command was not received or was corrupted in the transmission. A given command may be identified as being repeated by setting a flag within the command.

The television signal with inserted trigger commands is modulated and transmitted from the remote network via a satellite uplink or other transmission mechanism. This combined signal is correspondingly received at the digital broadcast station where it is digitized and routed through a video network for channel assignment and other processing. From the video network, the digitized television signal is provided to a VBI decoder which extracts the received trigger commands. The extracted trigger commands are provided to a server (i.e., an interactive program source) which controls the loading or playing of an interactive program in accordance with the trigger commands. The remainder of the digitized television signal is provided to a video encoder where it is compressed. An AVI (audio-video interactive) generation unit of the digital broadcast station then combines the compressed television signal and the interactive program to form an AVI signal to be broadcast to end users via a satellite uplink. The AVI signal may be formed by time-multiplexing packetized audio, video and interactive components of the AVI signal.

In one implementation, if a repeated trigger command is received by the server and the original command was not properly received, the interactive program source enters an error recovery state to determine the appropriate action for the interactive program source. For certain commands, such as continue, pause and stop, the interactive program source responds to the repeated command without further error compensation. For example, if a repeated stop command is received by the interactive program and the interactive program source is not in a "stopped" state, the interactive program source simply transitions to a stopped state in response to the repeated stop command. For other commands, such as a command to play a specified file at a particular time, an error recovery mechanism compares the time code associated with the command with the local time and indexes into the specified file at a point which compensates for the difference between the particular time indicated by the command and the actual time for playing. For example, if a repeated command is received two seconds after the particular time at which the file was to play, the error recovery mechanism causes the interactive program source to begin playing the specified file beginning at a point which is two seconds from the start of the file. In this manner, the play of the specified file in response to the repeated command is synchronized with the time at which the specified file would have been playing if the original command had been received and was responded to properly. The protocol and system for transmitting triggers from a remote network and for controlling interactive program content at a broadcast station in accordance with the present invention advantageously provides a mechanism by which the system may recover from failures in command transmission from a remote network.

Broadly speaking, the present invention contemplates an interactive television system comprising a remote network configured to transmit a television signal and to transmit an original interactive command to control an interactive program associated with the television signal. The remote network is further configured to transmit a redundant interactive command subsequent to transmitting the original interactive command. The interactive television system further comprises a broadcast station configured to receive the television signal and configured to detect incoming interactive commands associated with the television signal. The broadcast station is additionally configured to control the interactive program in response to the redundant interactive command.

The invention also contemplates a method for controlling interactive program content conveyed with a video signal from a broadcast station. The method comprises transmitting the video signal from a remote network, transmitting an original interactive command from the remote network to control an interactive program associated with the video signal, and transmitting a redundant interactive command. The method further comprises receiving the video signal and associated interactive commands at a broadcast station, and controlling an interactive program source in response to the redundant interactive command.

The invention still further contemplates a broadcast station for an interactive television system comprising a receiver configured to receive a video signal, an original interactive command and a repeated interactive command from a remote network, and an interactive program source coupled to receive the original interactive command and the repeated interactive command. The interactive program source is configured to detect whether a particular interactive command is an original or a repeated command. The interactive program source is configured to perform an operation in response to the repeated interactive command if the operation was not performed in response to the original interactive command.

The invention additionally contemplates a remote network for an interactive television system comprising a television signal source for providing a television signal, a trigger generator for generating interactive commands to control an interactive program associated with the television signal, and a trigger insertion unit coupled to the television signal source and to the trigger generator. The trigger insertion unit is configured to combine the television signal and the interactive commands. The trigger generator is configured to generate redundant interactive commands.

BRIEF DESCRIPTION OF THE DRAWINGS

Other objects and advantages of the invention will become apparent upon reading the following detailed description and upon reference to the accompanying drawings in which:

FIG. 8 is a table summarizing state transitions associated with the state diagram of FIG. 7.

Figure 1:
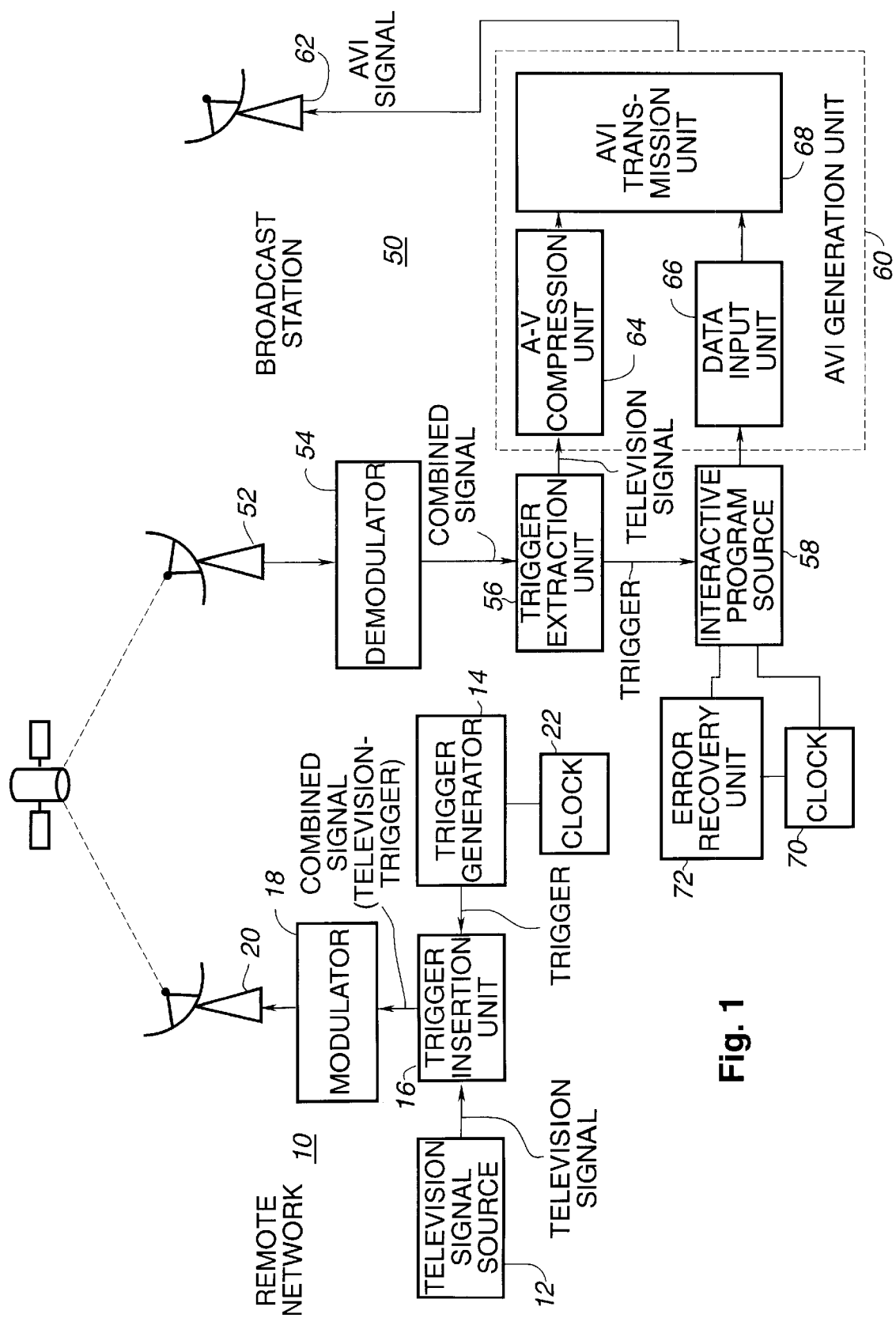
FIG. 1 is a block diagram of a flow manager and server architecture for an interactive television system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to the drawings, FIG. 1 is a block diagram of a system employing a protocol for transmitting triggers from a remote network and for controlling interactive program content at a broadcast station in accordance with an embodiment of the present invention. The system of FIG. 1 includes a remote network 10 for transmitting a television signal via satellite, and a broadcast station 50 which receives the television signal and provides interactive programming material therewith to form an AVI (audio-video-interactive) signal. The AVI signal is then transmitted by broadcast station 50 for receipt by end-users or a subsequent distribution link.

Remote network 10 illustratively includes a television signal source 12 and a trigger generator 14 coupled to a trigger insertion unit 16. An output of trigger insertion unit 16 is coupled to a transmitter collectively formed by a modulator 18 and a satellite uplink 20. A local time clock 22 is finally shown coupled to trigger generator 14.

Broadcast station 50 includes a receiver collectively formed by a satellite downlink 52 and a demodulator 54. An output of demodulator 54 is coupled to a trigger extraction unit 56, which in turn is coupled to an interactive program source 58 and an AVI generation unit 60. An output of the AVI generation unit 60 is shown coupled to a satellite uplink 62. For the embodiment of FIG. 1, AVI generation unit 60 illustratively includes an A-V (audio-video) compression unit 64 and a data input unit 66 coupled to an AVI transmission unit 68. A clock 70 and an error recovery unit 72 are finally shown coupled to interactive program source 58.

Generally speaking, trigger insertion unit 16 receives a television signal from television signal source 12 and provides trigger commands therewith to form a combined television-trigger signal. The trigger commands include information to control the loading and/or playing of an interactive program to be associated with the television signal and are generated by trigger generator 14. Certain trigger commands are also provided to allow the local time of the remote network 10, as determined by clock 22, to be conveyed to broadcast station 50. The combined signal is provided to modulator 18 where it is modulated upon a carrier in a manner suitable for transmission via satellite uplink 20.

The protocol associated with the trigger commands allows commands to be repeated, and allows the repeated commands to be specifically identified as being repeated. As will be described further below, by repeating trigger commands, broadcast station 50 may recover from situations wherein an original command is not received or is otherwise corrupted. Furthermore, for certain trigger commands, the error recovery unit 72 associated with interactive program source 58 compensates for the error to ensure proper playing of the interactive program material. This error compensation mechanism will also be explained in further detail below.

The transmission from remote network 10 is received by broadcast station 50 at satellite downlink 52 and is provided to demodulator 54. Following demodulation, the combined television-trigger signal is provided to trigger extraction unit 56 where the trigger is extracted. The extracted trigger is subsequently provided to an interactive program source 58 to control the loading or playing of the interactive program associated with the trigger. The remainder of the television signal is provided to A-V (audio-video) compression unit 64 of AVI generation unit 60 for compression.

When an interactive program is output from interactive program source 58 in accordance with the trigger extracted by trigger extraction unit 56, the interactive program is provided to AVI transmission unit 68 through data input unit 66. Compressed audio and video are similarly provided to AVI transmission unit 68 from A-V compression unit 64. AVI transmission unit 68 then combines the interactive program and the compressed components of the television signal to form an AVI signal to be broadcast to end users via satellite uplink 62.

Details regarding the illustrated implementations of remote network 10 and broadcast station 50 will be discussed next. It is understood that the trigger command protocol discussed herein may be employed within a variety of alternative system configurations.

Referring first to the remote network 10, television signal source 12 may comprise a live video feed and/or a video tape playback apparatus, among other mechanisms. In one embodiment, the television signal provided from television signal source 12 is compliant with the NTSC (National Television Systems Committee) signal standard. It is understood, however, that the television signal provided from television signal source 12 may be conveyed in a variety of alternative formats.

As stated previously, trigger generator 14 is provided to generate trigger commands including information to control an interactive program associated with the television signal from television signal source 12. Other trigger commands are provided to convey the remote network's local time to broadcast station 50. These trigger commands may take a variety of forms. FIGS. 2–6 illustrate exemplary trigger commands.

Figure 2:
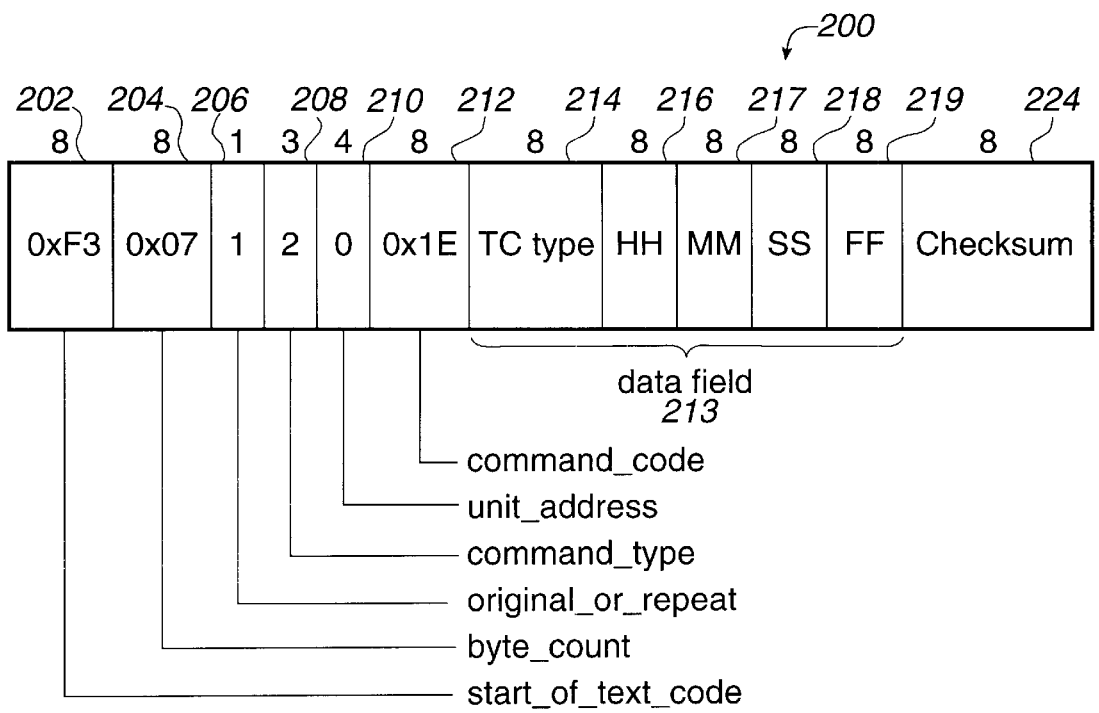
FIG. 2 is a diagram of an exemplary format for a trigger command for transmitting the remote network's local time.

FIG. 2 is a diagram of an exemplary format for a trigger command 200 for transmitting the remote network's local time. Trigger command 200 includes a "start of text code" field 202 which, for this implementation, takes on the value of 0xF3 (values specified beginning with "0x" are hexidecimal numbers). The start of text code is used to identify the start of all triggers. If a start of text code is not received upon completion of a previous trigger, an error condition is assumed by the interactive program source 58 of broadcast station 50, and all bytes up to the next start of text code are discarded. It is noted that other specific values may be used to identify the start of a particular trigger in other implementations.

Trigger command 200 further includes a "byte count" field 204 that contains a number indicative of the number of bytes that follow the byte count field 204 up to, but not including, the check sum field 224. The value within the byte count field 204 may take on decimal values from "1" to "255". In one implementation, the byte count field value of "0" is not allowed, and thus triggers may range in length from 4 to 258 bytes.

An "original or repeat" field 206 indicates whether the trigger is new or repeated. For this implementation a value of "1" indicates that the trigger is new, and a value of "0" indicates the trigger is repeated. As will be explained further below, ideally interactive program source 58 should react to the reception of a new trigger. The reaction of interactive program source 58 to a repeated trigger depends upon the current state of the interactive program source 58 and that which was intended by the original command, as will be discussed further below.

A "command type" field 208 indicates the intended interpretation of "command code" field 212, as described below. In other words, the interpretation of the command code field 212 depends upon the value of the command type field 208.

A "unit address" field 210 is provided to direct a trigger to a particular interactive program source of a receiving broadcast station. It is noted that in implementations wherein only a single interactive program source 58 is employed by broadcast station 50, the unit address does not change.

The "command code" 212 indicates the specific operation that must be executed. For the trigger command 200 of FIG. 2, which is a command for transmitting the remote network's local time, the command code is 0x1e, and the command type is 2. It is noted that other specific encodings may be alternatively used in other implementations.

A "data field" 213 is further shown within the trigger command 200 of FIG. 2. Generally, the data field of a trigger conveys information regarding the specific command to be executed. For the trigger command 200 of FIG. 2, the data field 213 includes a "time code type" field 214 which indicates the type of time code format. In one implementation, a "TC type" value of 0x00 indicates NTSC drop frame time code, a value of 0x01 indicates NTSC non-drop frame time code, and a value of 0x02 indicates PAL time code. The hour, minute, second, and frame fields 216–219 respectively, store the BCD (Binary Coded Decimal) values of the hour, minute, second, and frame of the time being conveyed by the trigger.

Finally, the "checksum" field 224 is used for detecting an error in a trigger command. The checksum field is calculated by 2's complementing the sum of all bytes between the byte count field 204 and the checksum field 224 (non-inclusive).

FIG. 2, (and similarly FIGS. 3–6) further illustrates the number of bits associated with each field of the depicted trigger commands. It is noted that other implementations may employ differing fields and/or differing numbers of bits for each field.

Figure 3:
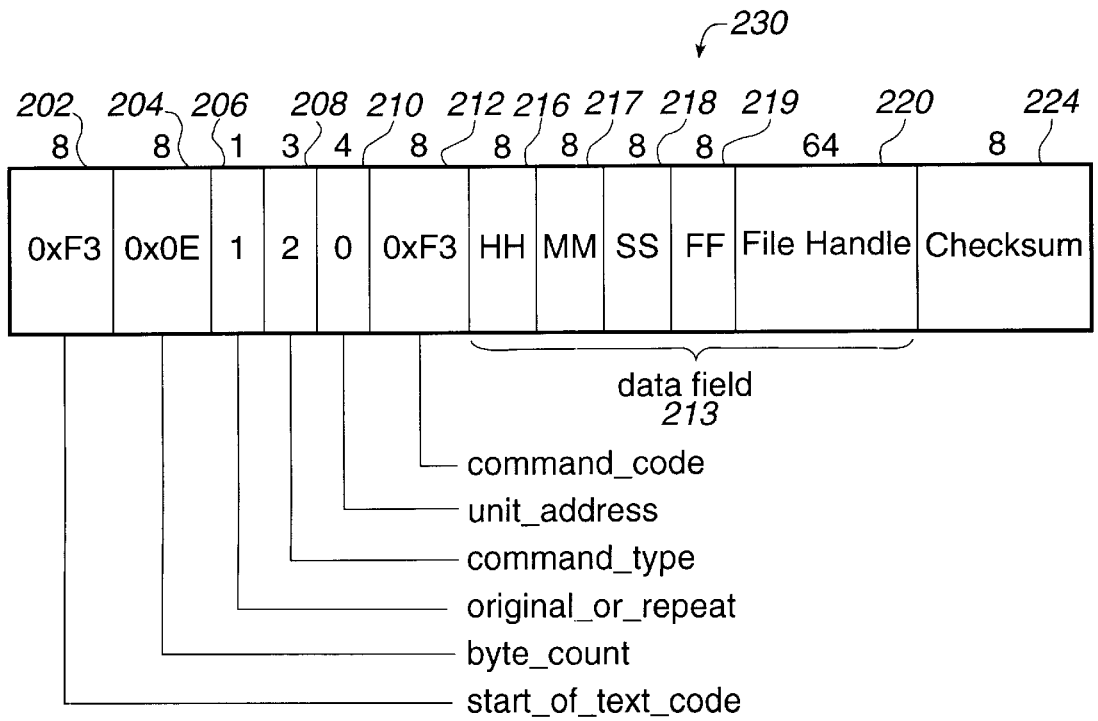
FIG. 3 is a diagram that illustrates an exemplary format for a trigger command for queuing a file and specifying a play time.

FIG. 3 is a diagram that illustrates an exemplary format of a trigger command 230 used for queuing a file and specifying a playtime. Fields that correspond to those of the trigger command 200 of FIG. 2 are numbered identically for simplicity.

The trigger command 230 is similar to that of FIG. 2; however, the command code field 212 for this trigger takes on a different encoded value to specify the differing function of this command. In addition, the byte count field 204 also takes on a different value to indicate the differing number of bytes forming this trigger command. The trigger 230 sends a relevant time code within fields 216–219, and a "file handle" field 220. The file handle 220 is an 8-byte word which is used by the interactive program source 58 to determine the appropriate file name. The time code is in the SMPTE time code format, and is of the type indicated by the time trigger 200. The trigger command 230 is used to cause interactive program source 58 to play the file specified by the file handle field 220 at the specified time.

Figure 4:
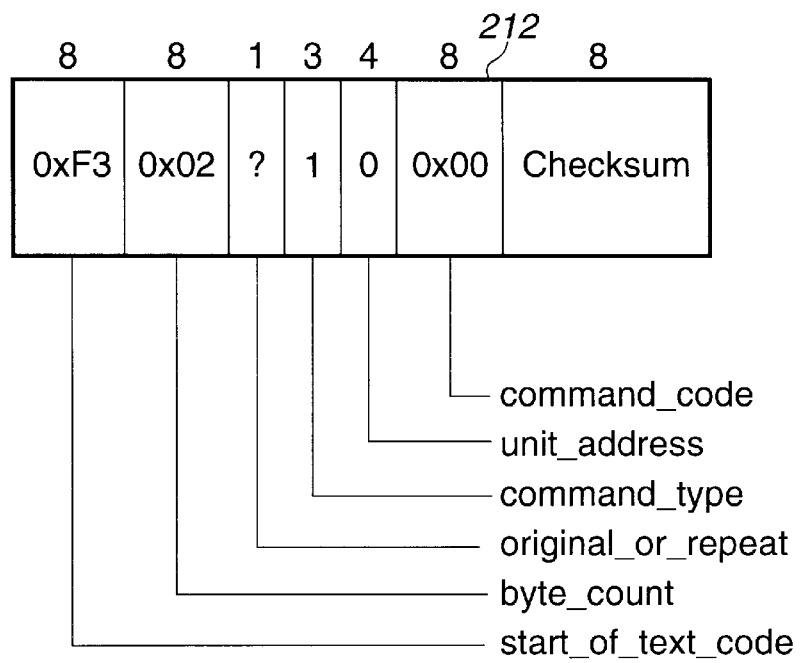
FIG. 4 is a diagram that illustrates an exemplary trigger command for stopping the file being broadcast.
Figure 5:
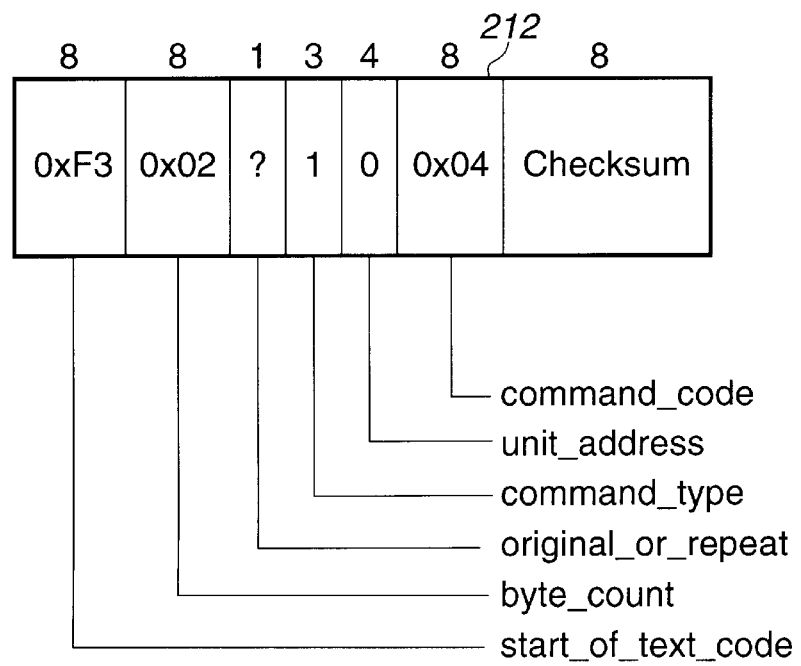
FIG. 5 is a diagram that illustrates an exemplary trigger command for pausing the file being broadcast.
Figure 6:
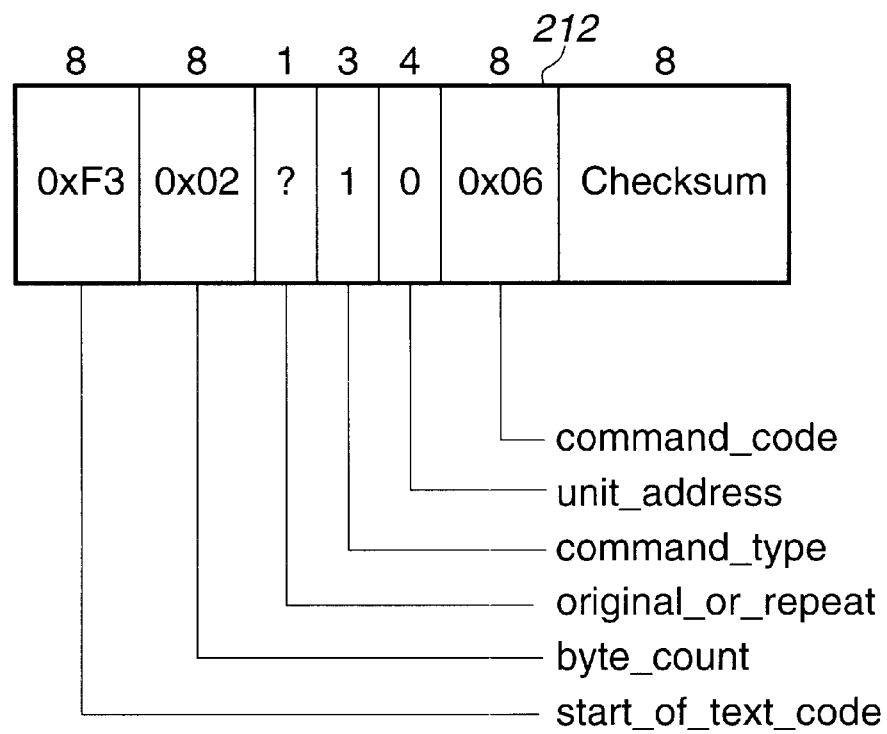
FIG. 6 is a diagram that illustrates an exemplary trigger command for continuing, following a paused state, the broadcast of the file.

Trigger commands for stopping, pausing, and continuing a file from the pause state are illustrated in FIGS. 4–6 respectively. These trigger commands are identical, with the exception of the encoded values of the command code fields 212, which indicate the specified function for the respective command.

Referring back to FIG. 1, trigger insertion unit 16 is configured to combine a television signal from television signal source 12 with trigger commands generated by trigger generator 14. In one implementation, trigger insertion unit 16 includes a VBI (vertical blanking interval) encoding mechanism which inserts a trigger into the vertical blanking region of the NTSC television signal. This combined signal is then provided to modulator 18 for transmission in a conventional manner. It is specifically contemplated that in alternative configurations, trigger insertion unit 16 may combine the trigger with the television signal using other techniques, such as DTMF (dual tone multi-frequency) coding or ancillary data carrier in the transmission.

When the transmission from remote network 10 is received by broadcast station 50, it is demodulated by demodulator 54. At this point, the combined television-trigger signal may be converted from its analog format into a digital format, such as the SMPTE 259M studio standard. The combined signal may further be routed through a video network, where it may be processed and/or taped and time-shifted. Subsequently, the combined signal is provided to trigger extraction unit 56. The extracted trigger and remaining television signal are then separately routed to interactive program source 58 and AVI generation unit 60, respectively.

For configurations in which the trigger is inserted within the vertical blanking interval of the television signal, trigger extraction unit 56 is implemented with a VBI decoder. It is noted that depending upon the manner in which triggers are inserted, other mechanisms to implement trigger extraction unit 56 may be alternatively employed, such as a DTMF decoder or a demodulator.

Interactive program source 58 is a source of interactive program information used to control, for example, operations of a set-top box. It will be appreciated that the set-top box is typically responsive to a user's remote control and provides an interactive display output to the user's television. The interactive program source 58 may be formed by a flow manager and server including a plurality of interactive programs contained in mass storage, such as a disk array. The interactive programs contained in mass storage may be installed from floppy disk, from tape storage, or through remote downloading, among other mechanisms.

When interactive program source 58 receives an original trigger (as identified by the "original or repeat" field 206), interactive program source 58 performs an operation in accordance with the command code and, if present, the time code or file handle of the trigger. For example, interactive program source 58 may receive a command 230 to queue (load)and play an interactive program specified by a specific file handle, in response to which interactive program source 58 loads the specified program from mass storage into a local memory (i.e., DRAM). Interactive program source 58 then plays the file corresponding to the file handle at the time specified by the time code. When interactive program source 58 plays a file, it outputs the specified interactive program in a bit stream to data input unit 66.

A trigger command 200 as illustrated in FIG. 2 may similarly be conveyed by remote network 10 to transmit the remote network's local time in order to synchronize the clock 70 of broadcast station 50 to the clock 22 of remote network 10. In other words, since the clock 22 and clock 70 may operate from slightly different crystal frequencies or may otherwise be offset from one another, the time of the remote network 10 as indicated by clock 22 may be conveyed to broadcast station 50 in order to ensure that the clock 70 indicates the same time.

As stated previously, an original trigger conveyed by remote network 10 may not be received by broadcast station 50 or may be corrupted. Accordingly, the command protocol utilized by remote network 10 allows triggers to be repeated.

Figure 7:
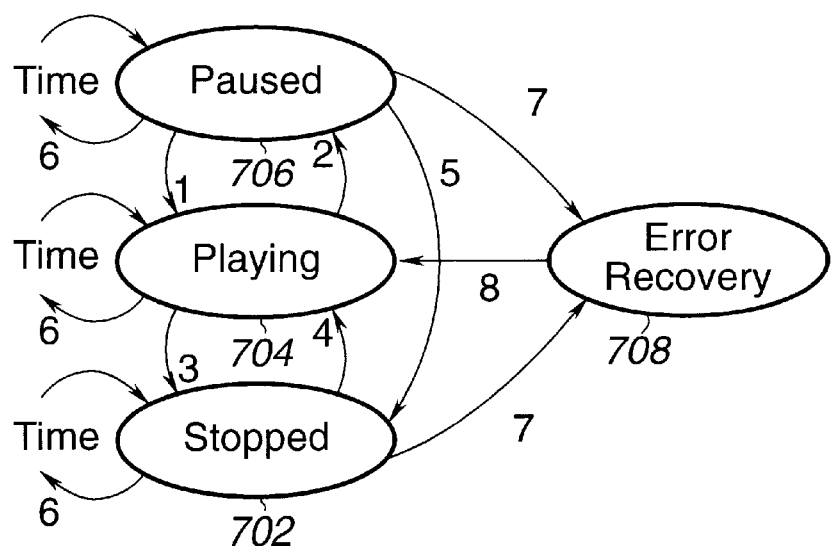
FIG. 7 is a state diagram illustrating operation of an interactive program source and an error recovery mechanism.

FIG. 7 illustrates a state diagram depicting states in which interactive program source 58 may be operating with respect to a particular loaded or queued file. As illustrated, interactive program source 58 may be in a stopped state 702, a playing state 704, a paused state 706, or an error recovery state 708. FIG. 8 is a table summarizing state transitions associated with the state diagram of FIG. 7. As indicated by transition number 1, if a continue trigger command is received during the paused command 706, interactive program source 58 transitions to playing state 704. This transition occurs regardless of whether the trigger is indicated as an original command or a repeated command. Similarly, transition number 2 occurs when a pause trigger command is received when interactive program source 58 is in playing state 704. As indicated by transitions 3 and 5, if a stop trigger command is received when the interactive program source is either in playing state 704 or paused state 706, interactive program source 58 transitions to stopped state 702. Transition number 6 depicts operation of interactive program source 58 when a time trigger command is received during either the stopped state 702, the playing state 704, or the paused state 706. When the time command trigger is received in any of these states, the interactive program source 58 verifies the time code on the trigger with the local time indicated by clock 70, and performs any necessary adjustments to the time indicated by clock 70.

As indicated by transition number 4, if a trigger command 230 for queuing a file and specifying a play time is received when interactive program source 58 is in stopped state 702, and if the trigger is indicated as original, the interactive program source 58 transitions to playing state 704, in which the interactive program source 58 starts the player at the specified time and plays the specified file. If a repeated command is received corresponding to the specified file while the interactive program source 58 is in playing state 704, the interactive program source 58 ignores the repeated trigger command.

On the other hand, if the interactive program source 58 receives a repeated trigger command to play a specified file at a specified time, and if the interactive program source 58 is in either stopped state 702 or paused state 706, interactive program source 58 transitions to error recovery state 708 as indicated by number 7. During error recovery state 708, the error recovery unit 72 determines the offset between the starting time code as indicated by the trigger command and the current time as indicated by clock 70. The interactive program source 58 then transitions to playing state 704 and begins play of the file. If the current time is subsequent to the starting time code indicated by the trigger command, the interactive program source 58 begins play of the file at a point as determined by error recovery unit 72. It is noted that in one embodiment, error recovery unit 72 is implemented in software. Furthermore, error recovery unit 72 may be an integral portion of interactive program source 58.

Referring back to FIG. 1, AVI generation unit 60 is a mechanism configured to combine a television signal from trigger extraction unit 56 with an interactive program from interactive program source 58 to thereby generate an AVI signal for subsequent transmission. The A-V compression unit 64 as illustrated within the specific embodiment of FIG. 1 is configured to compress the television signal using a compression algorithm such as MPEG2. A-V compression unit 64 is further configured to packetize the compressed audio and video components of the television signal into fixed bit length packets, and to provide a header for each packet for identification. This will be explained in further detail below.

Data input unit 66 provides an interface for interactive program information conveyed from interactive program source 58 to AVI transmission unit 66. Data input unit 66 may temporarily buffer interactive program information until AVI transmission unit 68 can receive the information. Similar to the output of A-V compression unit 64, interactive program information provided from data input unit 66 is packetized into fixed bit-length packets, with a header associated with each for identification. It is noted that the interactive program information may be alternatively packetized by interactive program source 58.

AVI transmission unit 68 is configured to combine the respective outputs of A-V compression unit 64 and data input unit 66 to form an AVI signal at its output. In one embodiment, AVI transmission unit is implemented using a multiplexer which time division multiplexes the respective audio, video and interactive program packets. The resulting time division multiplexed signal is then modulated on a carrier for transmission via satellite uplink 62.

Figure 9:
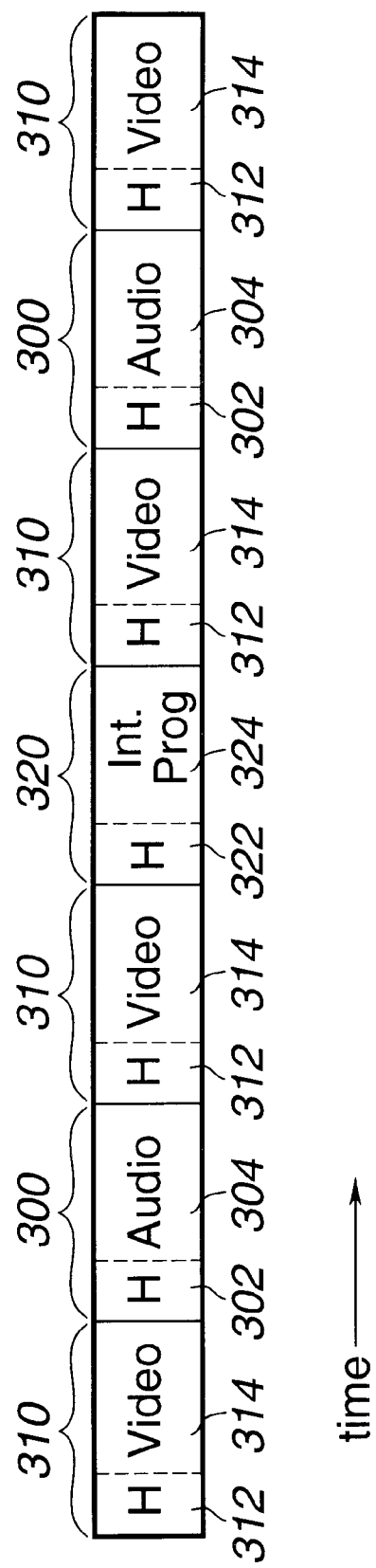
FIG. 9 is a diagram illustrating an exemplary format of an AVI signal.

FIG. 9 illustrates an exemplary format of an AVI signal generated by AVI transmission unit 68. The signal format of FIG. 9 includes time division multiplexed packets of audio, video, and interactive program information. Each audio packet 300 includes a header field 302 (designated by "H") and a data field 306. Similarly, each video packet 310 includes a header field 312 and a data field 314. Finally, each interactive program packet 320 includes a header field 322 and a code/data field 324. It will be appreciated that in the illustrated AVI signal, many more video packets 310 are transmitted as time elapses in comparison to the number of audio packets 300 and the number of interactive program packets 320. This is to accommodate the relatively high bandwidth requirements of video. The system supervisor may dynamically control the bandwidth allocations provided to the video, audio and interactive program packets, respectively, depending upon the particular requirements of the system at a given time. It is noted that the header of each packet is used by a receiving set top box to reassemble the television signal as well as the interactive program information according to an electronic program guide locally available in the set top box.

Further details regarding an exemplary embodiment of AVI generation unit 60 may be found within U.S. Pat. No. 5,448,568 entitled "System For Transmitting An Interactive TV Signal" by Delpuch et al. This patent is incorporated herein by reference in its entirety.

Figure 10:
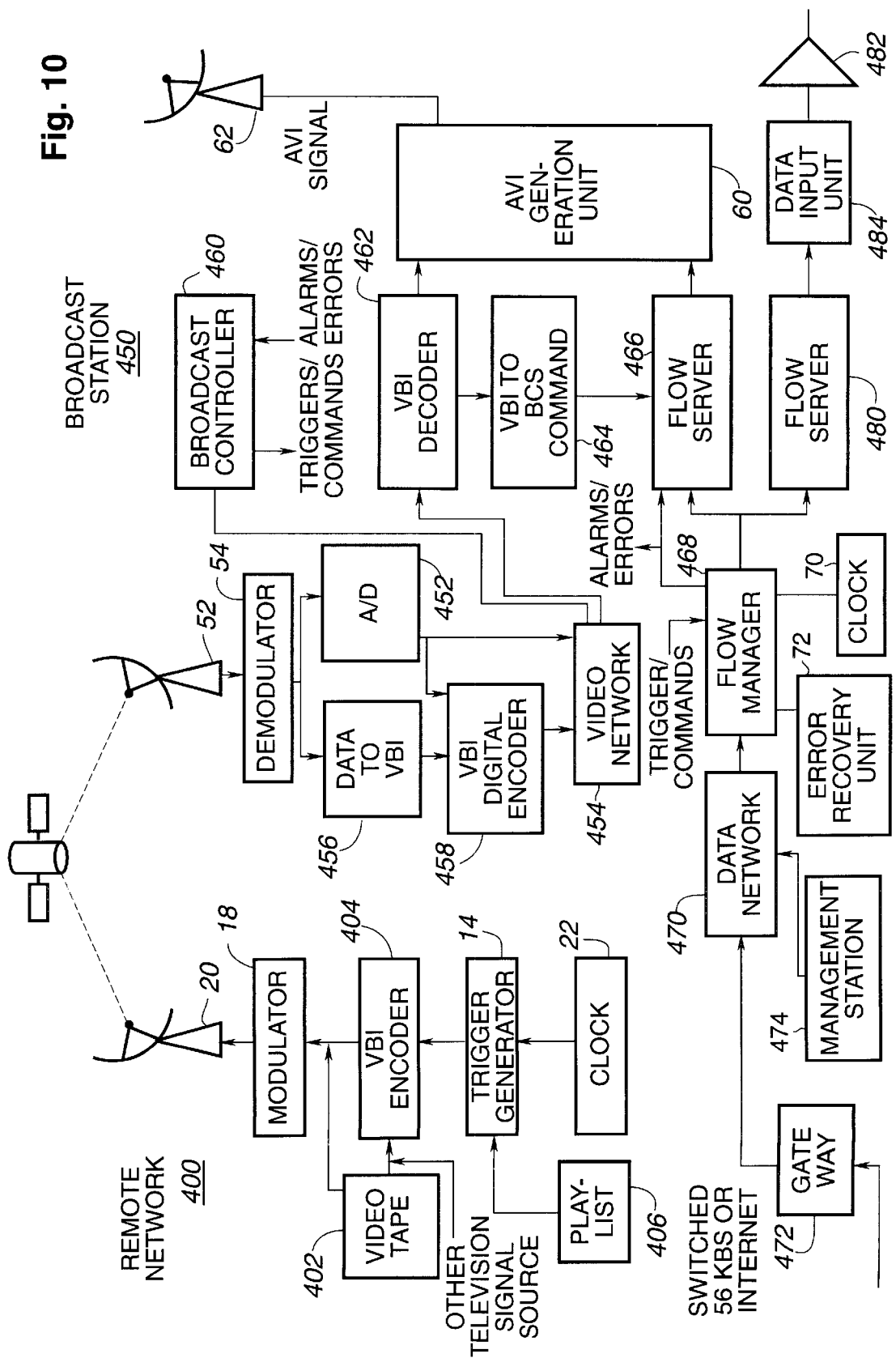
FIG. 10 is a block diagram of a flow manager and server architecture for an interactive television system.

Turning next to FIG. 10, a block diagram of another embodiment of a flow manager and server architecture for an interactive television system is shown. Circuit portions that correspond to those FIG. 1 are numbered identically for simplicity and clarity. The trigger command protocols as illustrated by FIGS. 4–8 are employed by the architecture of FIG. 10 in a manner similar to that described above.

The system of FIG. 10 includes a remote network 400 for conveying a television signal via a satellite uplink to a broadcast station 450 in a manner similar to that of the system of FIG. 1. FIG. 10 illustrates a video tape playback apparatus 402 coupled to a VBI encoder 404. The VBI encoder 404 encodes trigger commands generated by trigger generator 14 within the vertical blanking interval of a television signal from video tape playback apparatus 402 or from an alternative television signal source. Trigger commands are generated by trigger generator 14 in accordance with an electronic playlist 406 indicating the programs to be transmitted. A clock 22 is further coupled to trigger generator 14 to provide a time reference. It is noted that the electronic playlist 406 may further be coupled to control the specific television signal provided to VBI encoder 404, and that the playlist 406 may be implemented using a computer system. It is finally noted that video tape playback apparatus 402 may provide an output with trigger information already inserted within the vertical blanking interval of the television signal. This output may bypass VBI encoder 404 and be provided directly to modulator 18. In addition, similar to the embodiment of FIG. 1, trigger commands could be provided with the television signal using techniques such as DTMF coding or data carrier in the transmission. Such alternative trigger insertion techniques may be employed in the event that adequate VBI bandwidth is unavailable.

After the combined television-trigger signal is received and demodulated by broadcast station 450, the analog television signal is converted to a digital format by analog-to-digital converter 452. For the embodiment of FIG. 4, the SMPTE 259M digital television signal standard is employed. If the trigger commands are was encoded within the vertical blanking interval of the television signal, the digitized signal is then routed directly to the video network 454.

Broadcast station 450 includes a data-to-VBI conversion unit 456 which may be employed when the trigger commands, from remote network 400 are provided using an alternative coding scheme, such as DTMF coding or data carrier in the transmission. The data-to-VBI conversion unit 456 is configured to convert the trigger information received by broadcast station 450 to digitized information which can be inserted into the vertical blanking interval of the digitized television signal by VBI digital encoder 458. In this manner, television signals provided to video network 454 are encoded with trigger information within their vertical blanking intervals. Incorporating the trigger information directly within the digitized television signal itself avoids the necessity of having to know the delays associated with the television signal as it propagates through video network 454 (i.e., compared to a situation wherein the trigger information is routed via a different path to the trigger extraction mechanism).

Video network 454 is configured to process incoming television signals and may tape and/or time shift these signals. Video network 454 is further employed to assign designated incoming television signals to specified channels broadcast from digital broadcast station 450. It is noted that the illustrated output from video network 454 to VBI decoder 462 corresponds to a designated channel of broadcast station 450, and that additional, similarly configured channels may further be provided. Video network 454 is controlled by a broadcast controller 460.

Similar to the embodiment of FIG. 1, after passing through video network 454, a digitized television signal is provided to a VBI decoder 462 which extracts the VBI trigger information and provides a SMPTE 259M digitized television signal (without trigger information) to AVI generation unit 60. The extracted trigger information is provided to a VBI-to-BCS command unit 464, which converts the VBI digitized command into the native command format employed by broadcast controller 460. The native command corresponding to the trigger is then provided to flow server 466 or flow manager 468 to control the loading or playing of an interactive program designated by the trigger. AVI generation unit 60 combines the interactive programming information with the audio and video components of the television signal to form an AVI signal for transmission via satellite uplink 62.

Error recovery unit 72 operates in a manner similar to that described above with respect to FIG. 1. Specifically, error recovery unit 72 compensates for the difference between a specified play time and the current time when a repeated command is received and the original command was not received. Error recovery unit 72 determines an offset in the middle of a file to provide this compensation, as described previously.

FIG. 10 also illustrates a data network 470 and a gateway 472 through which interactive application programs can be loaded into flow manager 468. The gateway 472 may be coupled to remote locations via modem or internet. A management station 474 is further coupled to data network 472 allow local control of the downloading of interactive application programs into flow manager 468.

FIG. 10 finally illustrates an optional second flow server 480 which is also configured to receive interactive application programs from flow manager 468. The application programs are then provided to a transmitter 482 through a data input unit 484. The interactive program channel formed by flow server 480, data input unit 484, and transmitter 482 are advantageously provided to allow interactive program transmissions independent of an associated television signal. The output of transmitter 482 may be conveyed via a separate transponder of a satellite transmitting the AVI signal from satellite uplink 62.

It is noted that the architecture of FIG. 4 further allows broadcast controller 460 to control the generation of AVI signals for television programs that are provided locally to video network 454. It is further noted that broadcast controller 460 may receive alarms and errors from various system resources such as flow manager 468 and flow server 466.

Figure 11:
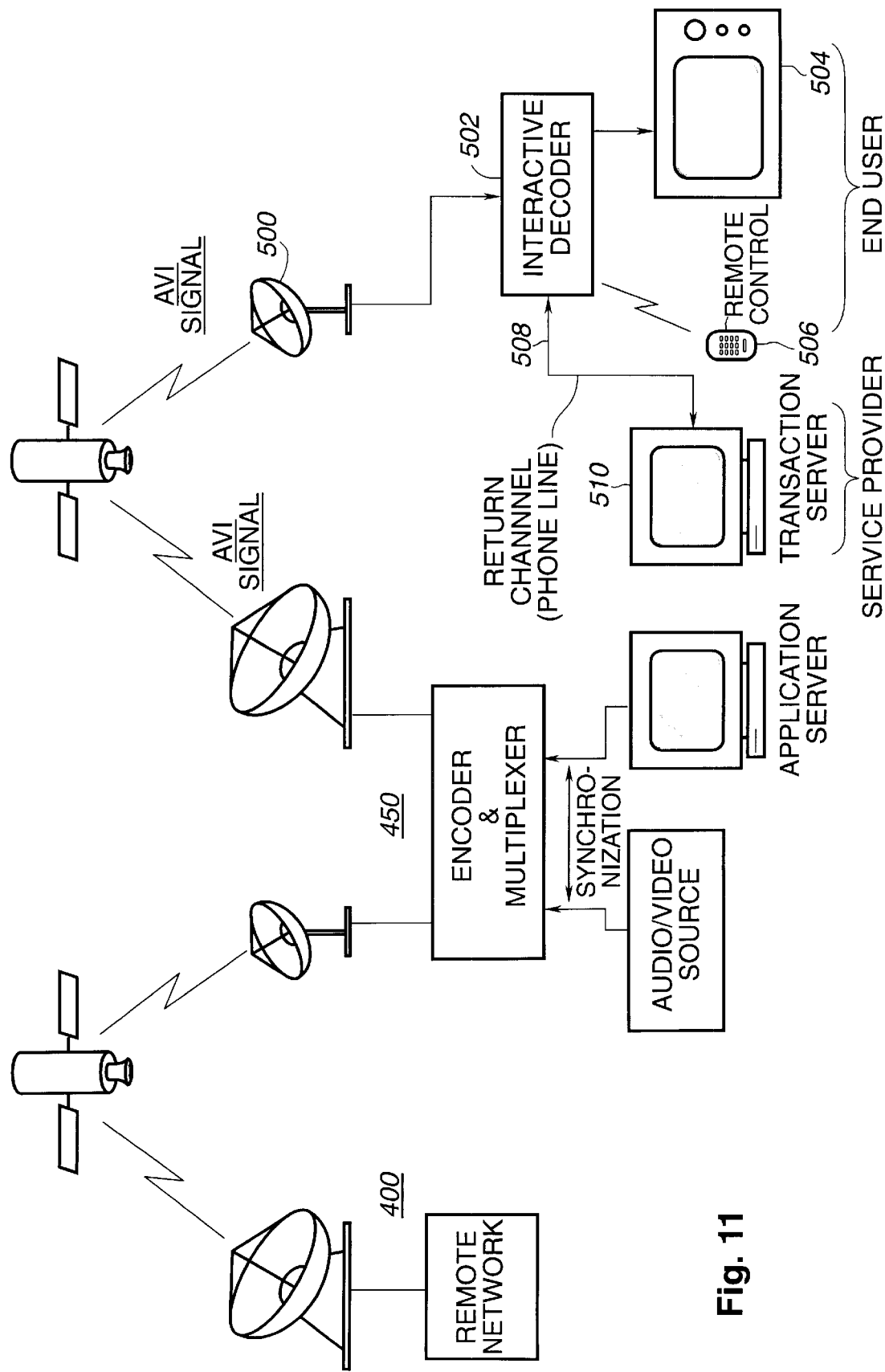
FIG. 11 is a block diagram of an interactive television system.

Turning finally to FIG. 11, a block diagram of an interactive television system employing the remote network 400 and broadcast station 450 of FIG. 10 is shown. FIG. 11 illustrates the receipt of an AVI signal from broadcast station 450 by an end user via a satellite downlink 500. The AVI signal is decoded by an interactive set top box 502 which provides an output to a television set 504. The interactive decoder 502 executes an interactive application program conveyed within a selected AVI signal to allow interactivity by a user under control of a remote control 506. A return channel 508 utilizing a phone line and associated modems (not shown) interconnects the interactive decoder 502 to a transaction server 510, which monitors certain selections by the user and responds accordingly, as desired.

Numerous variations and modifications will become apparent to those skilled in the art once the above disclosure is fully appreciated. For example, it is understood that the trigger command formats may take a variety of alternative forms, such as differing control and data fields. Similarly, a command may be indicated as being repeated in a variety of different manners. For example, repeated commands may be assigned command code values which are unique from the original command code values. It is intended that the following claims be interpreted to embrace all such variations and modifications.

What is claimed is:

1. A method for controlling interactive program content conveyed with a video signal from a broadcast station comprising:

transmitting said video signal from a remote network;

transmitting an original interactive command from said remote network to control an interactive program associated with said video signal;

transmitting a redundant interactive command after transmitting said original interactive command;

receiving said video signal and associated interactive commands at a broadcast station;

controlling an interactive program source in response to said redundant interactive command; and determining an offset between a time specified by said redundant interactive command to play an interactive program and an actual time for playing said interactive program in response to said redundant interactive command.

2. The method for controlling interactive program content as recited in claim 1 wherein said offset compensates for a delay incurred as a result of said broadcast station failing to receive said original interactive command.

3. A broadcast station for an interactive television system comprising:

a receiver configured to receive a video signal, an original interactive command and a repeated interactive command from a remote network;

an interactive program source coupled to receive said original interactive command and said repeated interactive command, wherein said interactive program source is configured to detect whether a particular interactive command is an original or a repeated command, and wherein said interactive program source is configured to perform an operation in response to said repeated interactive command if said operation was not performed in response to said original interactive command; and an error compensation unit coupled to said interactive program source, wherein said error compensation unit is configured to determine an offset between a specified time for playing an interactive program according to said repeated interactive command and a time at which said interactive program is actually played by said interactive program source.

4. The broadcast station for an interactive television system as recited in claim 3 further comprising a clock coupled to said error compensation unit, wherein said error compensation unit is configured to determine a difference between said specified time and a time specified by said clock.

5. The broadcast station for an interactive television system as recited in claim 4 wherein said interactive program source is further coupled to receive a trigger command to set said clock.

6. An interactive television system comprising:

a remote network configured to transmit a television signal and to transmit an original interactive command to control an interactive program associated with said television signal, wherein said remote network is further configured to transmit a redundant interactive command subsequent to transmitting said original interactive command, wherein said redundant interactive command is a command to play said interactive program at a specified time; and a broadcast station configured to receive said television signal and configured to detect incoming interactive commands associated with said television signal, wherein said broadcast station is further configured to control said interactive program in response to said redundant interactive command, wherein said broadcast station is further configured to determine an offset between said specified time and an actual time of starting to play said interactive program in response to said redundant interactive command;

wherein said redundant interactive command includes a bit field encoded to indicate that said redundant interactive command is repeated.

7. The interactive television system as recited in claim 6 wherein said offset specifies a point within said interactive program that compensates for a difference in said specified time and said actual time of starting to play said interactive program.

8. The interactive television system as recited in claim 6 wherein said remote network is further configured to transmit an additional interactive command to indicate a local time of said remote network, and wherein said broadcast station is configured to receive said additional interactive command and to set a clock of said broadcast station in accordance with said local time.

9. An interactive television system comprising:

a remote network configured to transmit a television signal and to transmit an original interactive command to control an interactive program associated with said television signal, wherein said remote network is further configured to transmit a redundant interactive command subsequent to transmitting said original interactive command; and a broadcast station configured to receive said television signal and configured to detect incoming interactive commands associated with said television signal, wherein said broadcast station is further configured to control said interactive program in response to said redundant interactive command;

wherein said redundant interactive command is a command to play said interactive program a specified time; and wherein said broadcast station is further configured to determine an offset between said specified time and an actual time of starting to play said interactive program in response to said redundant interactive command.

10. The interactive television system as recited in claim 9 wherein said broadcast station is configured to control said interactive program in response to said redundant interactive command if said original interactive command was not received by said broadcast station.

11. The interactive television system as recited in claim 9 wherein said broadcast station is further configured to ignore said redundant interactive command if said original interactive command was received by said broadcast station.

12. The interactive television system as recited in claim 9 wherein said offset specifies a point within said interactive program that compensates for a difference in said specified time and said actual time of starting to play said interactive program.

13. The interactive television system as recited in claim 9 wherein said remote network is configured to transmit said television signal, said original interactive command, and said redundant interactive command via a wireless transmission, and wherein said broadcast station is configured to receive said television signal, said original interactive command, and said redundant interactive command.

14. The interactive television system as recited in claim 9 wherein said remote network is further configured to transmit an additional interactive command to indicate a local time of said remote network, and wherein said broadcast station is configured to receive said additional interactive command and to set a clock of said broadcast station in accordance with said local time.

15. The interactive television system as recited in claim 9 wherein said broadcast station further includes an interactive program source for storing said interactive program and for controlling said interactive program in accordance with said incoming interactive commands.

16. A method for controlling interactive program content conveyed with a video signal from a broadcast station comprising:

transmitting said video signal from a remote network;

transmitting an original interactive command from said remote network to control an interactive program associated with said video signal;

transmitting a redundant interactive command;

encoding said redundant interactive command with a value to indicate that said redundant interactive command is a repeated command;

receiving said video signal and associated interactive commands at a broadcast station;

controlling an interactive program source in response to said redundant interactive command; and determining an offset between a time specified by said redundant interactive command to play an interactive program and an actual time for playing said interactive program in response to said redundant interactive command.

17. The method for controlling interactive program content as recited in claim 16 wherein said offset compensates for a delay incurred as a result of said broadcast station failing to receive said original interactive command.

* * * * *